D. G. McCAA.
APPARATUS FOR THE PRODUCTION OF HIGH POTENTIAL ELECTRIC CURRENTS.
APPLICATION FILED JUNE 28, 1909.
1,047,545.
Patented Dec. 17, 1912.
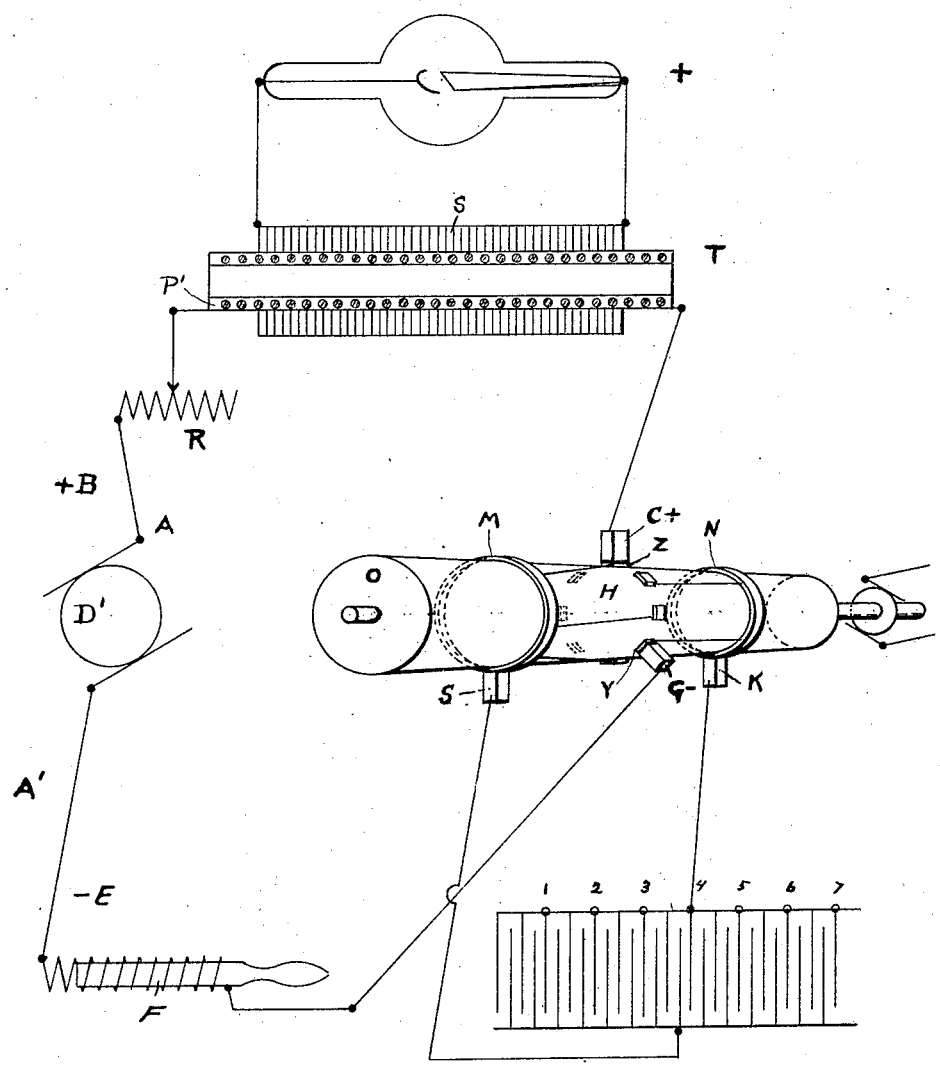
WITNESSES:
INVENTOR
David G. McCaa.
BY
ATTORNEY

UNITED STATES PATENT OFFICE.

DAVID G. McCAA, OF LANCASTER, PENNSYLVANIA.

APPARATUS FOR THE PRODUCTION OF HIGH-POTENTIAL ELECTRIC CURRENTS.

1,047,545.      Specification of Letters Patent.      Patented Dec. 17, 1912.

Application filed June 28, 1909. Serial No. 504,741.

REISSUED

*To all whom it may concern:*

Be it known that I, DAVID G. McCAA, a citizen of the United States, residing at Lancaster, in the county of Lancaster and State of Pennsylvania, have invented certain new and useful Improvements in Apparatus for the Production of High-Potential Electric Currents, of which the following is a specification, reference being had therein to the accompanying drawing.

This invention relates to an improved apparatus for producing either unidirectional pulsating high potential current or alternating high potential current.

The object in view is the arrangement of a plurality of improved means connected and associated in such a manner as to cause a continuous supply of current to force a pulsating unidirectional current through the primary of a transformer in order to create in the secondary, either a unidirectional pulsating high potential current or an alternating high potential current.

A further object of the invention is the arrangement in a device of the character described, of a rotating armature structure designed to have the brushes thereof connected to a circuit, including a source of current, and a primary winding of a transformer, and a condenser connected to the lugs or bearing members of the commutator in such a manner as to reverse the current entering the condenser, whereby successive impulses of current are permitted to pass through the primary winding of the transformer, whereby unidirectional pulsating current or alternating current may be taken off the secondary winding of the transformer.

With these and other objects in view the invention comprises certain novel constructions, combinations, and arrangement of parts, as will be hereinafter more fully described and claimed.

In the accompanying drawings the figure is a diagrammatic view of one embodiment of the invention.

In constructing a device embodying the invention, the same may be used for charging a condenser for high frequency currents with high potential alternating current, or for providing high tension unidirectional current, *i. e.*, pulsating current without any reverse tendency to the current, such pulsating unidirectional current being especially adapted for use in X-ray work. When providing high potential unidirectional pulsating current for X-ray use, an X-ray device is connected to the secondary of a transformer, and the primary of the transformer is connected with a source of direct current and with a pole changing device. The pole changing device is connected with a condenser and is rotated at any desired speed for controlling more or less the pulsation of the current in the transformer. The pole changer, however, is limited in its action on the current in the transformer by the condenser, or rather by the speed or capacity with which the condenser is adapted to be charged with current. By the particular construction of the pole changer, and the particular connection of the condenser thereto the condenser acts as a load, but as what might be termed an intermittent load, so that when the condenser is empty the current will flow rapidly into the condenser, but the flow will gradually decrease as the condenser is charged. This will cause a sudden rise in the magnetic effect of the primary of the transformer and a comparatively slow fall. The rise is from zero and the fall is back to zero but not below.

In order that the invention may be more clearly understood an embodiment of the same is shown in the accompanying drawings, in which 1 indicates a source of direct current which furnishes current to the primary windings 2, of the transformer 3, which current is controlled by devices hereinafter fully described for causing the current to pulsate through the primary windings 2, and cause either an induced alternating or an induced unidirectional pulsating current in the secondary winding 4, of the transformer, so as to provide a purely pulsating direct current to X-ray device 5. The secondary winding 4, is of course, provided with any desired number of turns for raising the tension of the induced current to the desired extent for use in the X-ray device. Current flowing from the source of current 1, will pass through wire 6, variable resistance 7, primary winding 2, wire 8, a switch changing device 9, condenser 10, and associated parts, wire 11, a variable self-inductance or choke coil 12, and wire 13, back to the source of current 1. This provides a complete circuit for the current, though, as a matter of fact, the current does not flow directly through the condenser 10, but charges the same with different polarity as the pole changer is rotated.

The pole changer 9, comprises a cylindrical member 14, constructed preferably of hardened rubber or other insulating material, and is mounted on a supporting shaft 15. Connected with the supporting shaft 15, is a motor of any desired kind, as for instance, an electric motor, for rotating the shaft, and member 14, which is rigidly secured thereto. Rigidly secured to the drum or member 14, are continuous metallic rings 17, and 18, which have connected therewith wires 19, and 20, respectively. Wires 19, are connected with metallic lugs or segments 21, and wires 20, are connected with metallic lugs or segments 22. The lugs or segments 21, and 22, are rigidly secured to the member or drum 14, and are arranged in a circle, but spaced apart, so that the brushes 23, and 24, make contact with the respective lugs as member 14, is rotated, the distance between the respective lugs being such that the brushes will leave one lug before it contacts with the next succeeding lug. Ring 17, has a brush 25, contacting therewith, while ring 18, has a brush 26, contacting therewith. Brushes 25, and 26, as well as brushes 23, and 24, are ordinarily stationary, though the same may be adjusted if desired, while the rings 17, and 18, and the lugs 21, and 22, rotate continuously as long as the pole changer is being operated. Brush 25, is connected by wire 27, to one side of condenser 10, while brush 26, is connected by wire 28, to the opposite side of condenser 10. By this structure and by the rotation of the pole changer positive current may pass in through wire 28, into the condenser for charging the same for a short time, or until brushes 23, and 24, have changed segments, whereupon the positive current will be switched to wire 27, and the negative side of the source of current will be switched to wire 26, so that the positive current will begin to flow into the negative side of the condenser or into what might be termed an electrical vacuum, which will, in a certain sense, draw the positive current therein. Positive current will flow over wire 27, into condenser 10, until the condenser is fully charged, or until the polarity of wire 27, has been changed by the pole changer. If the pole changer is not being rotated or is being rotated slowly the flow of current through wire 27, will cease when the condenser is fully charged, and will flow freely over wire 26, when the pole changer has been moved for shifting the lugs 21 and 22. By a device of this character current passing through the primary winding 2, of the transformer will cause a sudden or quick rise of lines of magnetic force by reason of the condenser 10, being in condition for receiving a charge. As soon as the condenser is charged or practically charged the current in the primary winding 2, will gradually decrease to zero, but will again rise to maximum upon the shifting of the lugs 21, and 22, as the polarity of the condenser will thereby be changed, so that the positive current may freely flow into the negative side of the condenser, and the positive side of the condenser be neutralized by the negative side of the source of current. It will be noted that there is practically no discharge of the condenser, but the same is continuously charged. When the condenser is charged so that one side is positive and the other negative, if the positive side of the source of current is switched to the negative side of the condenser, and the negative source of current to the positive side of the condenser, the negative side of the condenser will charge with positive current flowing into the same, and the positive side of the condenser will charge with negative current flowing into the same. This reversing of the polarity of the source of current connected to the condenser is continued so that the result in the primary winding 2, is a pulsating current. When the current in the primary winding 2, follows a curve, that is, when the time constant of the circuit is small, the secondary winding of the transformer will produce a current having a wave, as shown by oscillographic readings. It will be observed that the induced current in the transformer would have a negligible reverse current, but this is damped out by the resistance of the secondary, so that the X-ray device 5, is supplied with a uniform unidirectional pulsating current of a high tension.

When it is desired to change the time factor of the primary of the transformer 3, the variable resistance 7, is operated for causing the more or less lag of the current.

By the structure set forth it will be observed when the pole changer or commutator is rotated a succession of unidirectional pulsations of current will occur in the primary winding 2, and produce in the secondary winding either a pulsating unidirectional current of high potential, or an alternating high potential current, provided the choke coil is properly adjusted as well as the primary winding resistance of primary circuit.

This pulsating current produced in the secondary is of peculiar advantage in use in X-ray devices, as there is no inverse wave. The inverse wave in an X-ray device will have an injurious or more or less undesirable effect upon the X-ray device itself, and also will cause more or less objectionable effects and even disease to the operator. Also it will be noted that by the absence of spark gaps and other similar devices a larger amperage is provided in the secondary, and also the pulsation is more frequent, whereby the current produced is especially good for giving the best possible effects to the X-ray device with the least possible injurious effect.

What I claim is:—

1. In a device of the character described, a source of current, a transformer with the primary in series with the source of current, a condenser in series with the primary and source of current, and a pole changer interposed between the primary of said transformer and said condenser for causing said source of current to successively charge, neutralize and recharge said condenser, and by such action supply pulsating unidirectional current in said primary of said transformer.

2. In a device of the character described, the combination with a direct current supply, of a transformer having its primary winding in series with the current supply, a condenser in series with the primary winding of the transformer and the current supply, and a continuously rotatable pole changer interposed between the transformer and condenser for successively charging, neutralizing and recharging said condenser with electrical charges of opposite signs, whereby current is permitted to flow in successive impulses from said source of supply through said primary of said transformer for inducing a unidirectional pulsating current in the secondary of the transformer when the time constant of the primary is small.

3. In a device of the character described, the combination with a direct current supply, of a transformer having its primary winding in series with the current supply, a condenser in series with the primary winding of the transformer and the current supply, and a continuously rotatable pole changer interposed between the transformer and condenser for successively charging, neutralizing and recharging said condenser with electrical charges of opposite signs, whereby current is permitted to flow in successive impulses from said source of supply through said primary of said transformer for inducing an alternating current in the secondary of the transformer when the time constant of the primary is large.

4. In a device of the character described, the combination with a direct current supply, of a transformer device having its primary connected in series with said current supply, a condenser in series with said primary and said current supply, a pole changer interposed between said condenser and said primary, means for moving said pole changer for successively changing the polarity of the current supplied to the condenser in order to permit a pulsating current to flow through the primary, and means for varying the time constant of the circuit of which the primary is a part by varying the resistance of said circuit.

5. In a device of the character described, the combination with a direct current supply, of a transformer device having its primary connected in series with said current supply, a condenser in series with said primary and said current supply, a pole changer interposed between said condenser and said primary, means for moving said pole changer for successively changing the polarity of the current supplied to the condenser in order to permit a pulsating current to flow through the primary, and means for varying the time constant of the circuit of which the primary is a part by varying the self-inductance of said circuit.

6. In a device of the character described, the combination with a direct current supply, of a transformer device having its primary connected in series with said current supply, a condenser in series with said primary and said current supply, a pole changer interposed between said condenser and said primary, means for moving said pole changer for successively changing the polarity of the current supplied to the condenser in order to permit a pulsating current to flow through the primary, means for varying the ohmic resistance of the circuit of the primary; and means for varying the self-inductance of the circuit of which the primary is a part, said last mentioned means being independent of said ohmic resistance.

7. In a device of the character described, the combination with a source of current supply, of a transformer having the primary winding thereof in series with the current supply, a condenser in series with said current supply and said primary winding, and a pole changer interposed between the condenser and the primary winding of said transformer, said pole changer comprising a rotatable supporting member, a pair of spaced rings, brushes for connecting said rings and said transformer, a plurality of lugs connected alternately to said rings, a brush designed to engage said lugs successively as the same are rotated connected with said primary winding, and a second brush arranged to contact with said lugs connected with said source of current supply, the first mentioned brush contacting with said lugs and designed to complete a circuit through one of said rings, while said second mentioned brush contacts with said lugs and completes a circuit through the other of said rings.

In testimony whereof I affix my signature in presence of two witnesses.

DAVID G. McCAA.

Witnesses:
 WM. J. COULTER,
 MABEL L. LEFEVRE.